(12) United States Patent
Sulzmann

(10) Patent No.: US 6,540,638 B2
(45) Date of Patent: Apr. 1, 2003

(54) REVERSING GEAR FOR AUTOMATIC TRANSMISSION

(75) Inventor: Manfred Sulzmann, Tettnang (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/734,470

(22) Filed: Dec. 11, 2000

(65) Prior Publication Data

US 2001/0039229 A1 Nov. 8, 2001

(30) Foreign Application Priority Data

Dec. 18, 1999 (DE) .......................... 199 61 275

(51) Int. Cl.⁷ .......................... F16H 57/04; F16H 57/08
(52) U.S. Cl. .................. 475/210; 475/319; 475/322; 475/159; 192/113.3
(58) Field of Search ................. 475/210, 211, 475/319, 320, 321, 322, 159; 192/115, 113.3

(56) References Cited

U.S. PATENT DOCUMENTS

| | | | |
|---|---|---|---|
| 4,450,944 A | * 5/1984 | Fujioka et al. | 192/113.34 |
| 5,024,638 A | * 6/1991 | Sakakibara et al. | 192/12 D |
| 5,609,538 A | 3/1997 | Nogle et al. | 475/159 |

FOREIGN PATENT DOCUMENTS

| | | | |
|---|---|---|---|
| DE | 31 49 880 A1 | 7/1982 | |
| DE | 36 38 422 A1 | 5/1987 | |
| DE | 42 01 653 C2 | 7/1992 | |
| DE | 41 36 040 C1 | 1/1993 | |
| DE | 43 34 950 A1 | 4/1994 | |
| DE | 195 15 616 A1 | 10/1996 | |
| DE | 197 06 055 A1 | 8/1997 | |
| GB | 2093133 A | * 8/1982 | ................ 475/210 |

OTHER PUBLICATIONS

Kalpakjian, Serope. *Manufacturing Engineering and Technology*, 3rd ed. Reading, Mass., Addison–Wesley, 1995, p. 925.*

"Stufenloses Getriebe", *ATZ Automobiltechnische Zeitschrift 96*, 1994, 6, p. 380.

* cited by examiner

*Primary Examiner*—Ankur Parekh
(74) *Attorney, Agent, or Firm*—Davis & Bujold, P.L.L.C.

(57) ABSTRACT

The automatic transmission for a motor vehicle having one starting element, one input shaft, one output shaft and gear sets for determining the reduction ratio and having one planetary reversing gear for reversal of direction of rotation of the input shaft. In the planetary reversing gear is situated one ring gear consisting of one ring (1) with inner teeth and with a smooth outer wall and of one disc carrier (2) segmentally welded on the ring.

6 Claims, 2 Drawing Sheets

REVERSING GEAR FOR AUTOMATIC TRANSMISSION

FIELD OF THE INVENTION

This invention concerns an automatic transmission for a motor vehicle having one starting element, one input shaft, one output shaft, gear sets whose selective engagements by pairs determine different reduction ratios and one planetary reversing gear for reversing the direction of rotation of the input shaft to make possible the reverse gear of the vehicle.

BACKGROUND OF THE INVENTION

Automatic transmissions are designed as multi-step transmissions or as continuously variable automatic transmissions also called CVT. The latter comprise one starting unit, one forward/reverse gear unit, one variator, one intermediate shaft and one differential. The automatic transmissions are usually driven by an internal combustion engine, via an input shaft, such as the crankshaft. Either a starting clutch or a hydrodynamic torque converter serves as starting unit. The forward/reverse gear unit serves for reversing the direction of rotation of the input shaft for the reverse gear. This unit is mostly designed as a planetary reversing gear. The latter consists of at least one sun gear, several planetary gears, one ring gear, one brake and one clutch of multi-disc design. The variator consists of two cone pulley pairs and one belt-drive organ, each cone pulley pair, in turn, consisting of a first cone pulley stationary in the axial direction and a second cone pulley movable in the axial direction. Between the cone pulley pairs rotates the belt-drive organ such as a pushing linked band. Due to the adjustment of the second cone pulley, the rotor radius of the belt-drive organ changes and thus the ratio of the continuously variable transmission.

The *Automobiltechnischen Zeitschrift* 96 (1994), No. 6, page 380 has disclosed a continuously variable transmission having one forward/reverse gear unit. One first shaft driven by the impeller of the hydrodynamic torque converter drives the planetary gears connected via a common first planet spider. Each planetary gear is rotatably supported on a pin. On one hand, the planetary gears mesh with a sun gear located upon a second shaft and, on the other hand, with a ring gear. The ring gear can be fixed by a brake of multi-disc design against a stationary wall, such as the transmission housing. The second planet spider is connected by a clutch of multi-disc design with the first cone pulley. When the clutch is closed, the planetary reverse gear rotates as a whole with the ratio 1 and the same direction of rotation as the first shaft. The direction of rotation for the reverse gear is reversed when the brake is closed.

From the Applicant's DE A 195 15 616 is known a forward/reverse gear unit that comprises one first shaft and one second shaft, one planetary gear, one brake and one clutch. The planetary gear has one sun gear, several planetary gears and one ring gear. The planetary gears respectively sit rotatably upon a pin and are driven via a common planetary spider, the planetary spider being designed integrally with the first shaft. A second planetary spider leads to the inner disc carrier of the clutch, it is possible to design the first and second planet carriers in one piece. The ring gear is connected with an inner disc carrier of the brake. The brake consists of the inner disc carrier, the inner discs, outer discs, one outer disc carrier and one end disc, as a gear tooth system and one piston with recoil device.

The ring gear is integrally connected with a buffer disc and thus supports itself, via the buffer disc, either on a fixed wall or on the first planetary spider. In the forward gear range, no rotational speed difference exists between the ring gear and the first planetary spider. Only in the reverse gear range with a service of about 0.5% does there exist a rotational speed difference between the two parts.

The buffer disc supports itself in the radial direction on one face of the fixed wall. A rotary part, the shaft or the like, can also be considered as a support. The buffer disc can also be radially supported by means of a bearing arrangement.

The ring gear of the planetary reversing set is usually provided on its outer side with a gear tooth system which includes the lining of the discs. The cooling oil is supplied to the discs, via holes, which are partly diagonally placed in the disc teeth. The production of the lube oil holes and also that of the engaging gears is expensive.

SUMMARY OF THE INVENTION

The problem on which the invention is based is to simplify the construction of the planetary reversing set of a forward/reverse gear unit of an automatic transmission, especially a continuously variable automatic transmission, so that during the same operation a less expensive production is ensured with optimum operation and, at the same time, the oil supply of the discs is secured under all operating circumstances.

It is provided, therefore according to the invention, that the ring gear consist of one ring with inner teeth and with smooth outer wall and of a disc carrier segmentally welded on the ring.

The disc carrier can be produced inexpensively as a metal plate shaped part without further machining operation. Since the disc carrier is segmentally welded on impressions provided on the joining points with the ring gear, there result between the disc carrier and the ring gear, along the areas between the impressions, gaps through which the lube oil is thrown as result of the centrifugal force on the inner side of the engaging gears of the disc carrier. Th lube oil can be precisely guided to the cooling friction surfaces through oil-passage windows situated between the discs, i.e. in the disc teeth of the disc carrier. The oil-passage windows can be placed by means of the shaping tool at no cost in the disc carrier. Because of the non-machining processing, the oil-passage windows can be placed in the optical axial position, whereas in the prior art, the positions of the oil-passage windows are, in part, predetermined only limitedly by the possible angle and the position of the hole.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
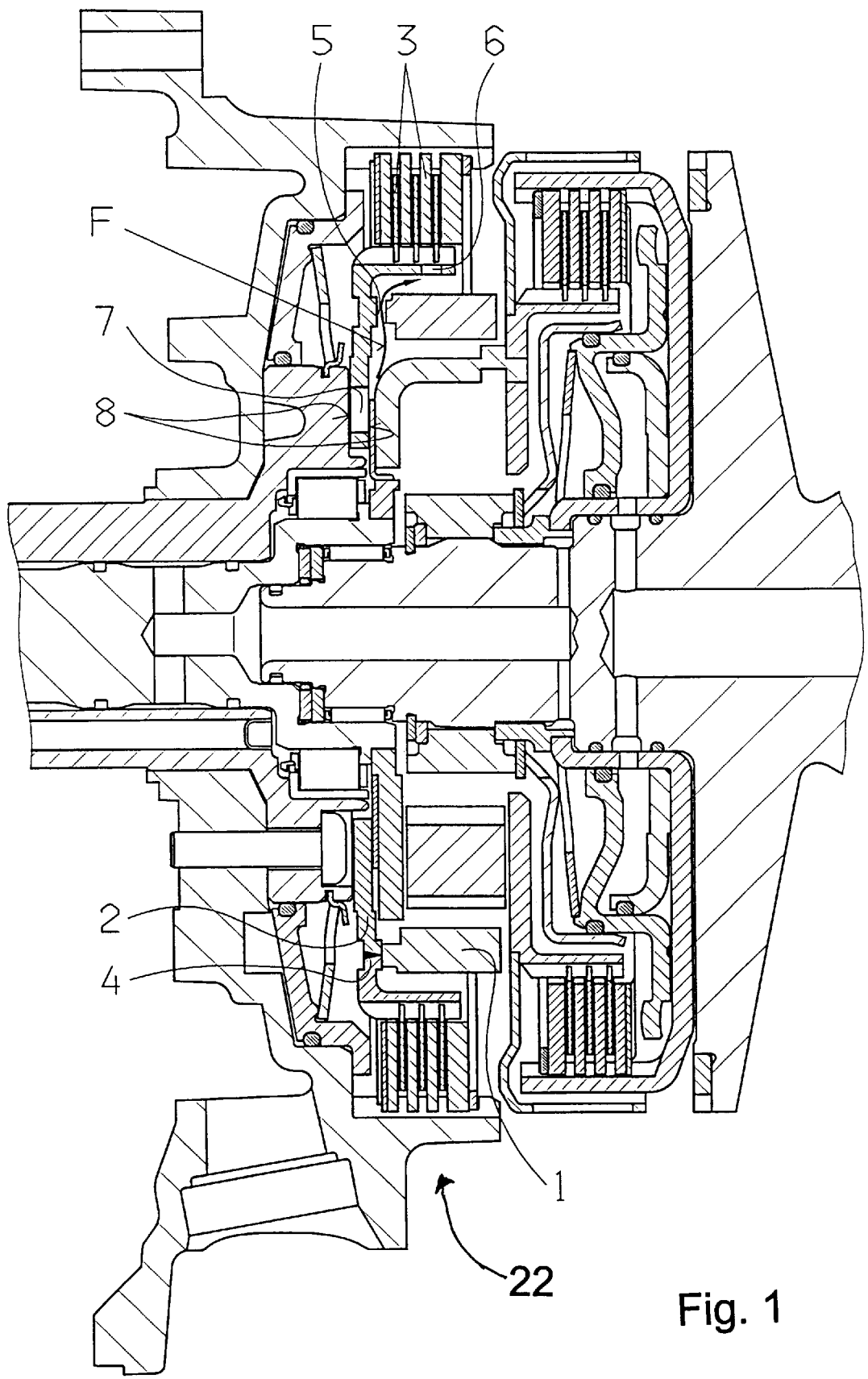
FIG. 1 is a diagrammatic cross-sectional view of the reversing gear.

According to the invention, the ring gear of the planetary reversing set consists of one ring 1 with inner meshing gears and with smooth outer wall and of one disc carrier 2 segmentally welded with the ring 1. The disc carrier 2 can be economically produced as a metal plate shaped part without further machining operation.

Along its periphery the disc carrier 2, which carries discs designated with 3, has on the joining points impressions on which it is segmentally welded with the ring 1. This means that in the areas between the impressions along the periphery of the disc carrier 2 between the latter and the ring 1, there are gaps 5 through which the lube oil is thrown under centrifugal force on the inner side of the engaging gears of the disc carrier.

In the disc teeth, there are further provided oil-passage windows 6 through which the lube oil is guided precisely to the friction surfaces to be cooled. The oil-passage windows can economically be worked in by the shaping tool in the disc carrier. Since no machining operation is required, the oil-passage windows can be provided in the optimal axial position. With the arrow F is indicated the oil flow through the gap 5 and through the oil-passage windows 6; with 4 is designated one of the welding points which in one of the impressions of the disc carrier connect the latter with the ring 1.

The axial thrust of the ring gear comprised of ring 1 and disc carrier 2 can be absorbed via the bottom 8 designed as a buffer disc of the disc carrier 2. The latter rotates according to the direction of force either, e.g. on a non-ferrous metal disc or on a hardened steel shaft.

If the ring gear, consisting of ring 1 and disc carrier 2, is designed in the proximity of the oil-pressure supply as a radial piston pump for oil pressure supply to the automatic transmission, then an oil current generates conditioned by principles of the pump input, also called the eccentric space. The oil must be able to leave the space with as little resistance as possible and be available for lubrication purposes. To simplify this, in the bottom of the disc carrier 2, apertures 7 are provided which guide the oil from the eccentric space to the inner side of the disc carrier. The apertures can also be produced with the shaping tool without machining so that they cause no cost during the production of the part. Contrary to machined apertures which can only be designed as round holes, the shape can be selected as desired with a stamping tool.

It is further possible that the disc carrier 2 be inwardly chamfered on the side of the transmission, remote from the motor, whereby it performs a function similar to that of an already known baffle plate.

Figure 2:
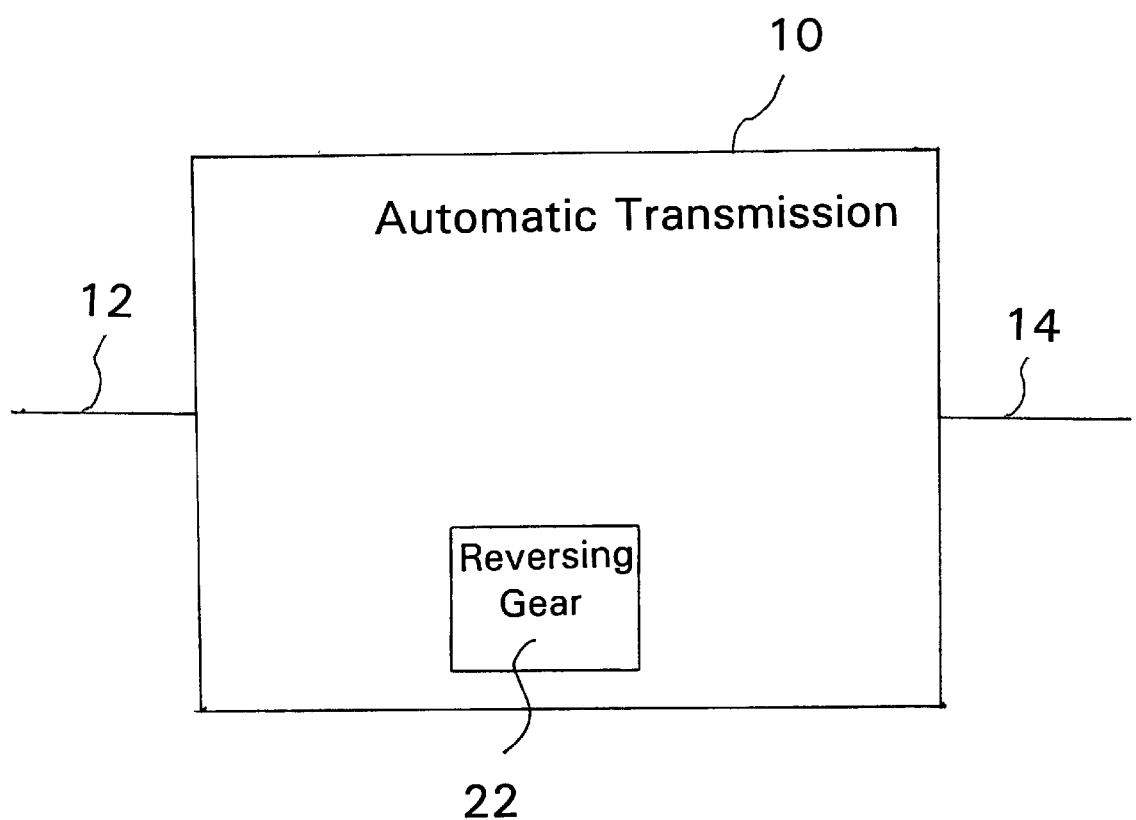
FIG. 2 is a diagrammatic representation of an automatic transmission with the reversing gear. Since such transmissions are known to the expert, only the structural parts needed for understanding of the invention have been provided with reference numerals.

An automatic transmission for a motor vehicle is diagrammatically shown in FIG. 2. An input shaft 12 supplies drive to the automatic transmission 10 while an output shaft 14 conveys the output of the automatic transmission 10. The automatic transmission 10 contains a reversing gear 22 and a gear sets which, depending upon the engaged pairs of gears, determines the output ratio.

Reference Numerals

1 ring
2 disc carrier
3 discs
4 welding point
5 gap
8 thrust bottom
10 automatic transmission
12 input shaft
14 output shaft
22 reversing gear
F oil flow

What is claimed is:

1. A reversing gear for an automatic transmission of a motor vehicle, the reversing gear comprising:

a disc carrier having a radially extending support and an axially extending peripheral wall;

a plurality of radially extending discs circumferentially supported by an outermost surface of the peripheral wall of the disc carrier; and a ring gear supported by the radially extending support of the disc carrier but inwardly spaced from the peripheral wall of the disc carrier to define a circumferential space therebetween;

wherein the ring gear is welded to a plurality of spaced apart projections formed on the radially extending support of the disc carrier so as to define a plurality of spaced apart fluid passages between the ring gear and the disc carrier to facilitate the flow of fluid therethrough.

2. The reversing gear for an automatic transmission of a motor vehicle according to claim 1, wherein a plurality of secondary fluid passages are formed in the peripheral wall of the disc carrier to provide fluid communication between the circumferential space and the discs supported by the disc carrier.

3. The reversing gear for an automatic transmission of a motor vehicle according to claim 1, wherein a lubricant flow path is established to the circumferential space between the ring gear and the disc carrier and from the circumferential space to the discs supported by the disc carrier via a plurality of secondary fluid passages formed in the peripheral wall of the disc carrier.

4. A reversing gear for an automatic transmission of a motor vehicle, the reversing gear comprising:

a sun gear;

planet carrier with at least two planet engaging with the sun gear;

a brake having a first and second sets of plurality of radially extending discs;

a multidisc clutch;

a ring gear (1) having a gearing on an inwardly facing surface which engages with the at least two planet gears and a smooth outwardly facing surface;

a disc carrier having a radially extending support and an axially extending peripheral wall;

the first set of the plurality of radially extending clutch discs supported by an outermost surface of the peripheral wall of the disc carrier; and the ring gear being supported by the radially extending support of the disc carrier but inwardly spaced from the peripheral wall of the disc carrier to define a circumferential space therebetween;

wherein the ring gear is welded to a plurality of spaced apart projections formed on the radially extending support of the disc carrier so as to define a plurality of spaced apart fluid passages between the ring gear and the disc carrier to facilitate the flow of fluid therethrough.

5. The reversing gear for an automatic transmission of a motor vehicle according to claim 4, wherein a plurality of secondary fluid passages are formed in the peripheral wall of the disc carrier to provide fluid communication between the circumferential space and the discs supported by the disc carrier.

6. The reversing gear for an automatic transmission of a motor vehicle according to claim 4, wherein a lubricant flow path is established to the circumferential space between the ring gear and the disc carrier and from the circumferential space to the discs supported by the disc carrier via a plurality of secondary fluid passages formed in the peripheral wall of the disc carrier.

* * * * *